US007636766B2

(12) United States Patent
Abramowitz

(10) Patent No.: US 7,636,766 B2
(45) Date of Patent: Dec. 22, 2009

(54) REMOTE SELECTION AND INSTALLATION OF AUXILIARY CONTENT

(75) Inventor: Marc S. Abramowitz, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 681 days.

(21) Appl. No.: 11/274,245

(22) Filed: Nov. 15, 2005

(65) Prior Publication Data
US 2007/0113178 A1   May 17, 2007

(51) Int. Cl.
G06F 15/16 (2006.01)
G06F 17/00 (2006.01)
G06F 3/00 (2006.01)
G06F 3/048 (2006.01)
G06F 7/00 (2006.01)

(52) U.S. Cl. .............. 709/217; 709/200; 715/223; 715/234; 715/253; 715/751; 715/779; 715/788; 715/760; 715/762; 707/102

(58) Field of Classification Search ............ 709/217, 709/200; 715/223, 234, 253, 751, 779, 788, 715/760, 762; 707/102
See application file for complete search history.

(56) References Cited

U.S. PATENT DOCUMENTS

| 6,122,661 | A  * | 9/2000  | Stedman et al. ........... 709/217 |
| 7,536,641 | B2 * | 5/2009  | Rosenstein et al. ......... 715/234 |
| 2004/0088438 | A1 * | 5/2004  | Madril et al. ............. 709/250 |
| 2004/0169680 | A1 * | 9/2004  | Stevens et al. ............ 345/763 |
| 2004/0249950 | A1 * | 12/2004 | Christensen et al. ........ 709/227 |
| 2005/0216880 | A1 * | 9/2005  | Erickson et al. ........... 717/101 |
| 2005/0234929 | A1 * | 10/2005 | Ionescu et al. ............ 707/100 |
| 2008/0086459 | A1 * | 4/2008  | Ryan ..................... 707/3 |

OTHER PUBLICATIONS

Biz Stone, Blogging: Genius Strategies for Instant Web Content, New Riders, Sep. 11, 2002 (pages retrieved from Safari Books Online).*
HTTP Ads: An easier, better way to make more money selling ads online. Retrieved from http://web.archive.org/web/20021129191513/http://www.httpads.com/, publication date: Nov. 29, 2002.*
Ohayon, Ouriel, "Typepad is launching blog widgets", pp. 1-8, Mar. 30, 2006. http://www.techcrunch.com/2006/03/30/typepad-is-launching-blog-widgets/.

(Continued)

*Primary Examiner*—Philip C Lee
(74) *Attorney, Agent, or Firm*—Darby & Darby P.C.; Jamie L. Wiegand

(57) ABSTRACT

A system, method, and apparatus are directed to managing auxiliary content through an enhanced content management system (ECMS), for such as a blog, over a network. Auxiliary content may be selected from a networked device over the network for integration with another site, such as the blog. Such auxiliary content may include graphics, advertisements including sponsored advertisements, selectable audio clips, or the like. When the auxiliary content is selected, and a identifier of the other site is provided, data that may include a script, code, or the like, and that enables access to the auxiliary content is provided to the ECMS using the identifier. The ECMS may then use the data to position the auxiliary content within the other site. Once the position is determined, automatic incorporation of the auxiliary content within a webpage may also be performed using the ECMS.

9 Claims, 6 Drawing Sheets

OTHER PUBLICATIONS

Skelton, Andy, "What are WordPress Widgets?", WordPress Blog, pp. 1-3, Feb. 25, 2006. http://andy.wordpress.com/2006/02/25/what-are-wordpress-widgets/.

Matt, "Widgets Plugin", WordPress Blog, pp. 1-19, Mar. 29, 2006. http://wordpress.org/developmen/2006/03/widgets-plugin/.

Schenk, Maarten, "Introducing Sidebar Manager for Movable Type", Sidebar Manager, pp. 1-6, Jan. 15, 2006. http://www.majordojo.com/projects/SidebarManager.

"Plugin API", Serendipity, pp. 1-13. http://www.s9y.org/43.html#A3.

"WordPress Features, WordPress Codex", WordPress, pp. 1-10, Mar. 8, 2006. http://codex.wordpress.org/WordPress_Features.

"Word Press—Wikipedia, the free encyclopedia", Wikipedia, pp. 1-2, Oct. 26, 2005. http://enwikipedia.org/wiki/WordPress.

Williams, Evan, "Blogger API", pp. 1-2, Mar. 8, 2006. http://www.blogger.com/developers/api/1_docs/.

Winer, Dave, "RFC: Meta Weblog API", pp. 1-5, Mar. 14, 2002. http://www.xmlrpc.com/metaWeblogApi.

* cited by examiner

US 7,636,766 B2

REMOTE SELECTION AND INSTALLATION OF AUXILIARY CONTENT

FIELD OF THE INVENTION

The present invention relates generally to application software, and more particularly, but not exclusively, to an apparatus and method for managing auxiliary content through a content management system (CMS), such as a blog, over a network.

BACKGROUND OF THE INVENTION

The amount of readily available content available to a user over a network, such as the Internet, has increased almost exponentially over the past several decades. Moreover, there is little indication that this rate of increase in available content will not continue in the foreseeable future. Providers of such content include blogs, news sources, sports sources, weather sources, libraries, friends, universities, businesses, and the like. Many of these content providers provide new or changed content almost regularly.

Management of such content has been made easier by using various applications, including a content management system (CMS). Simply stated, a CMS is often a web application that a content provider may employ to manage a website and web content. There exists a wide variety of such CMSs from which a content provider may select. However, many of today's CMSs remain limited in scope in what content may be managed or how it may be managed. This may be especially true where the content may be obtained from another source over a network. Moreover, many CMSs today may be complex, requiring a level of technical knowledge that some content providers would prefer not to have to master. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
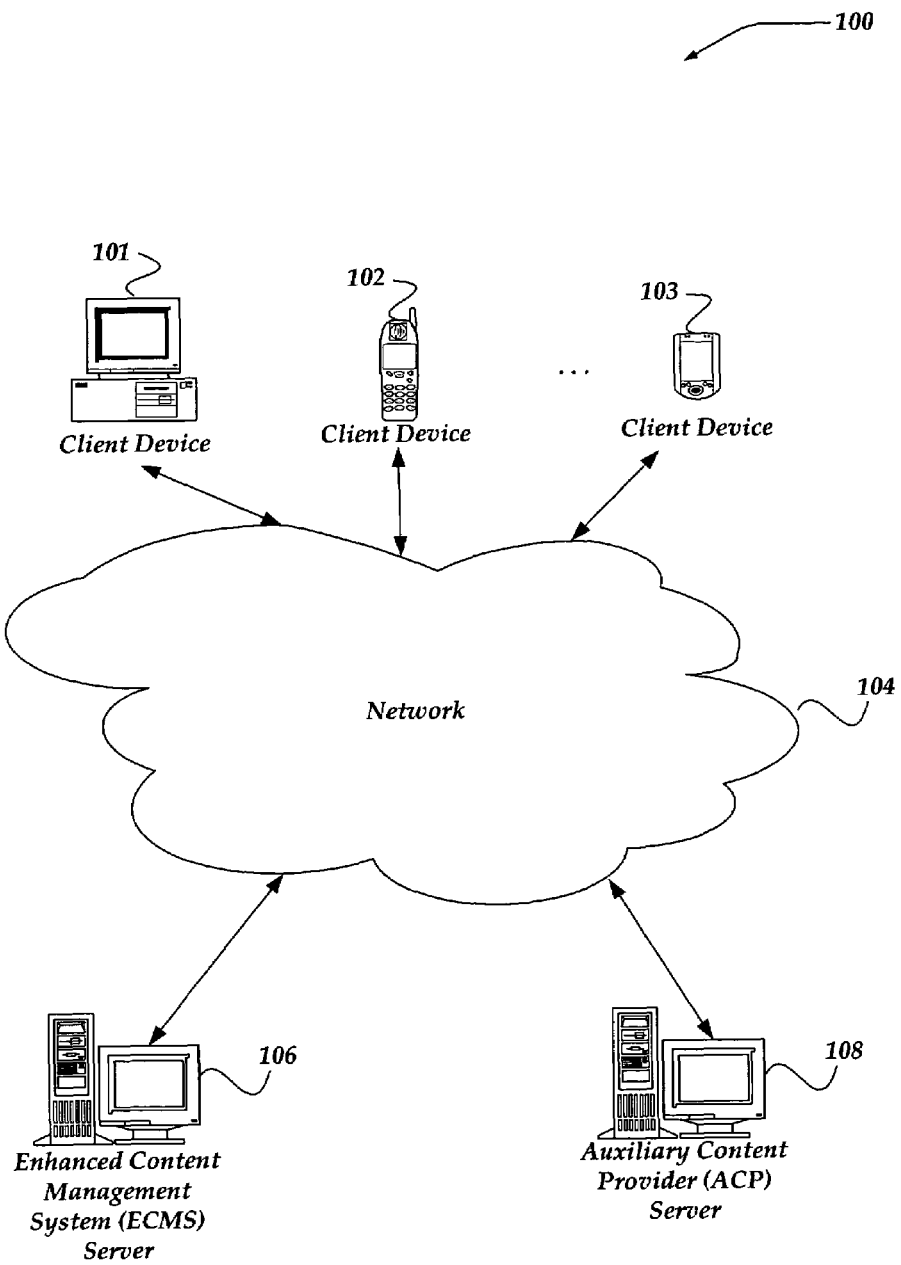
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. The phrase "in another embodiment" as used herein does not necessarily refer to a different embodiment, although it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Additionally, as used herein, the term "API" refers to any form of application programming interface, or the like. An API may be implemented in any programming language, or enabled by hardware. An API may expose objects along with their methods, function calls, or the like. Such an API may include, but is not limited to, a web services interface, a remote procedure call (RPC) interface, or the like. Several APIs have been written that allow external programs to get and set text and various other attributes of a weblog (blog) post, including MetaWeblog API, BLOGGER™ API, and the like. Moreover, at least some of the APIs may employ various communication protocols, such as RPC, eXtensible Markup Language (XML)-RPC, RSS, or the like.

Briefly stated, the present invention is directed towards a system, method, and apparatus for use in managing auxiliary content through an enhanced content management system (ECMS), such as a blog, over a network. Auxiliary content may be selected from a networked device over the network for integration with another site, such as the blog. Selected auxiliary content may include graphics, advertisements including sponsored advertisements, selectable audio clips, photographs, banners, brands, or the like. When the auxiliary content is selected, a network address of the other site also may be provided. Data may then be provided to the ECMS through the network address. The data may include a script, code, applet, application, HTML, or the like, that enables access to the auxiliary content by the ECMS. In one embodiment, an API is used to provide the data to the ECMS. The ECMS may then be employed to position the auxiliary content within a webpage. In one embodiment, the ECMS enables positioning of the auxiliary content within a side bar, a top bar, a bottom bar, or the like. In one embodiment, the auxiliary content may also be positioned with respect to other auxiliary content, or even within primary content. Once the position is determined, automatic incorporation of the auxiliary content within the webpage may also be performed using the ECMS. In one embodiment, incorporation of the auxiliary content includes inserting at least a portion of the data and/or auxiliary content into a template associated with the side bar, top bar, bottom bar, or the like.

Figure 3:
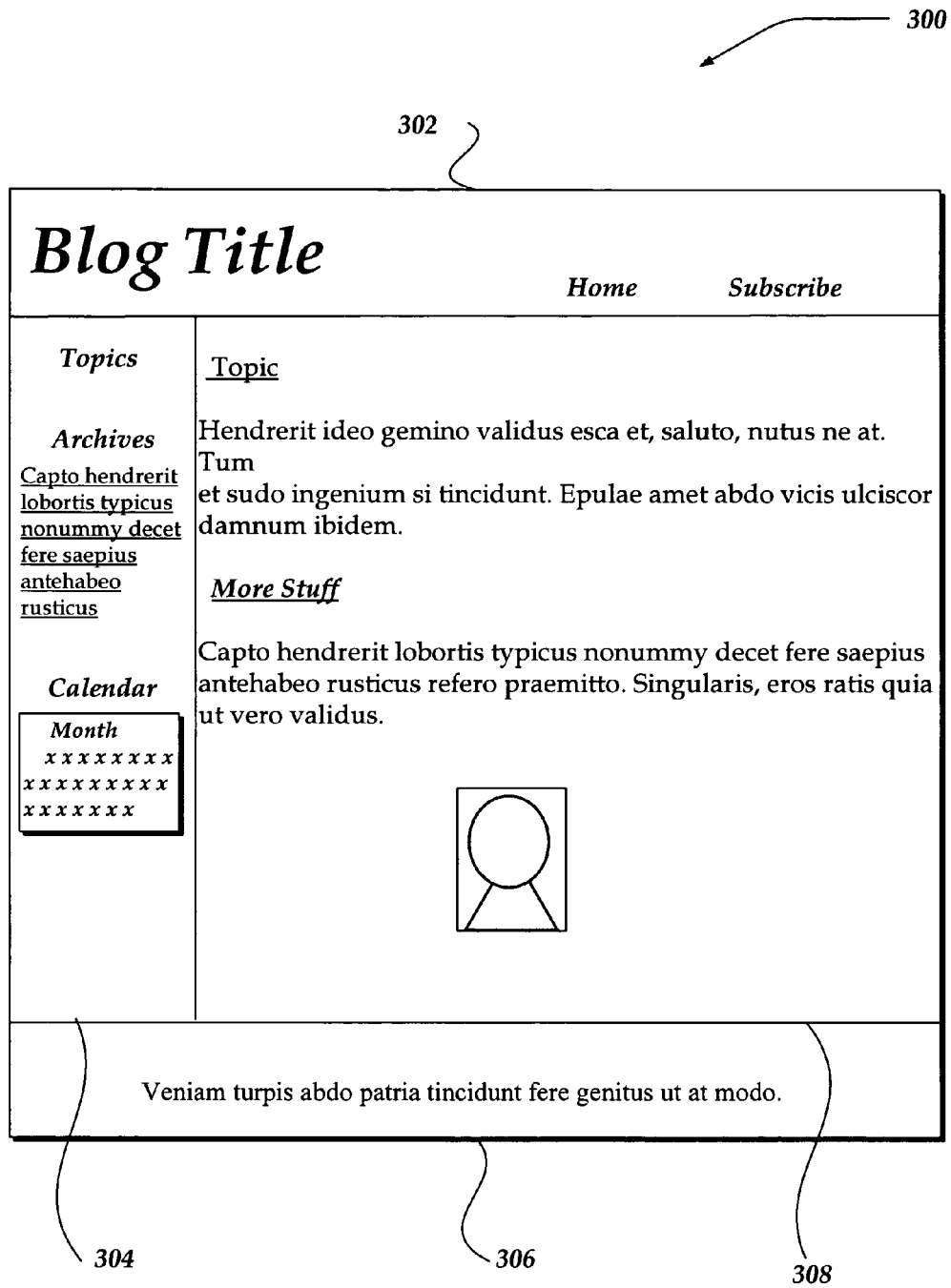
FIG. 3 illustrates one example of a typical blog webpage showing auxiliary content and primary content.

As used herein, the term "auxiliary content" refers to a placement and/or a relevance of the content based, in part, on a theme of a website. Such theme may include any of a variety of topics, interests, or the like, including, but not limited to business, education, gossip, dating, car repair, music, movies, finance, personal, technical, news, or the like. "Primary content" typically is directed to the theme of the website, while, in one embodiment, auxiliary content may be considered to complement or support the primary content. For example, auxiliary content may include advertisements, archival content, brand, calendars, photographs, or the like. In one embodiment, auxiliary content may be displayed and/or accessed through side bars, top bars, bottom bars (or frames) or a website. FIG. 3, described in more detail below, provides one embodiment of an example website useable to illustrate positioning of auxiliary content.

Illustrative Operating Environment

FIG. 1 shows components of an exemplary environment in which the invention may be practiced. Not all the components shown may be required to practice the invention, and variations in the arrangement and type of the components may be made without departing from the spirit or scope of the invention.

As shown in the figure, system 100 includes client devices 101-103, network 104, Enhanced Content Management System (ECMS) server 106, and Auxiliary Content Provider (ACP) server 108. Network 104 enables communication between client devices 101-103, ECMS server 106, and ACP server 108.

Generally, client devices 101-103 may include virtually any computing device capable of connecting to another computing device and receiving information. Such devices may also include portable devices such as cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 101-103 may also include other computing devices, such as personal computers, multiprocessor systems, microprocessor-based or programmable consumer electronics, network devices, and the like. As such, client devices 101-103 may range widely in terms of capabilities and features. For example, a client device configured as a cell phone may have a numeric keypad and a few lines of monochrome LCD display on which only text may be displayed.

In another example, a web-enabled client device may have a touch-sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client devices 101-103 also may include at least one client application that is configured to communicate with a network device, such as ECMS 106, ACP server 108, or the like. The client application may include a capability to provide and receive textual content, graphical content, audio content, alerts, messages, and the like. Moreover, client devices 101-103 may be further configured to communicate a message, such as through a Short Message Service (SMS), Multimedia Message Service (MMS), instant messaging (IM), internet relay chat (IRC), mIRC, JABBER™, and the like, between another computing device.

The client application also may enable client devices 101-103 to access ACP server 108 to obtain auxiliary content useable for display within a webpage. For example, the client application may enable a user to review content available from ACP server 108, and to select at least a portion of the content for use as auxiliary content within the webpage. The selected content may include virtually any of a variety of content, including a brand, a logo, a picture, a graphic, a movie, an advertisement including a sponsored advertisement, an audio clip, financial information, or the like. The client application may then enable the user to indicate a network address for ECMS 106, so that ACP server 108 may communicate with ECMS 106. In one embodiment, the network address is a URL; however, the invention is not so limited, and the network address may also be an IP address, or the like. In one embodiment, the client application is a browser. However, the client application may also be an IM application, SMS application, an audio-driven application, or the like.

In one embodiment, client devices 101-103 may be configured such that an end-user may operate the computing device to make requests for data, such as auxiliary content, and/or services from other computers on the network. In one embodiment, client devices 101-103 may employ a network interface unit (sometimes called a transceiver), such as described below, to communicate information with another computing device. Often, the requested data resides in computing devices such as ACP server 108. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

Network 104 is configured to couple one computing device with another computing device. Network 104 may be enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art. Furthermore, remote computers and other related electronic devices could be remotely connected to either LANs or WANs via a modem and temporary telephone link.

Network 104 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 104 may also include an autonomous system of terminals, gateways, routers, and the like connected by wireless radio links, and the like. These connectors may be configured to move freely and randomly and organize themselves arbitrarily, such that the topology of network 104 may change rapidly.

Network 104 may further employ a plurality of access technologies including 2nd (2G), 2.5, 3rd (3G), or 4th (4G) generation radio access for cellular systems, WLAN, Wireless Router (WR) mesh, and the like. Access technologies such as 2G, 3G, and future access networks may enable wide area coverage for mobile devices, such as one or more of client devices 101-103, with various degrees of mobility. For example, network 104 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 104 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, network 104 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

ACP server 108 may include any computing device capable of communicating packets with client devices 101-103 and/or ECMS 106. Each packet may convey a piece of information. A packet may be sent for handshaking, i.e., to establish a connection or to acknowledge receipt of data. The packet may include information such as a request, a response, or the like. In one embodiment, the packets may include content, such as auxiliary content that may be displayable, or otherwise useable within a webpage managed and/or hosted by ECMS 106. In another embodiment, the packet may include code, a script, HTML, an applet, or the like, that is useable to access the auxiliary content by such as ECMS 106. Generally, packets received by ACP server 108 will be formatted according to TCP/IP, but they could also be formatted using another transport protocol, such as User Datagram Protocol (UDP), Internet Control Message Protocol (ICMP), NetBEUI, IPX/SPX, token ring, and the like. Moreover, the packets may be communicated between ACP server 108 and another computing device employing HTTP, HTTPS, or the like.

In one embodiment, ACP server 108 is configured to operate as a website server. However, ACP server 108 is not limited to web servers, and may also operate a messaging server, a File Transfer Protocol (FTP) server, a database server, a graphic server, and the like. ACP server 108 may include an interface, such as a web-based interface that enables a user to select auxiliary content for incorporation into a webpage. ACP server 108 may further provide webpages, scripts, applets, applications, or the like, that receive a network address for ECMS 106 that may be employed to communicate with ECMS 106. ACP server 108 may send auxiliary content to ECMS 106. In one embodiment, ACP server 108 may enable access to the auxiliary content by sending data such as code, a script, URL, applet, application, HTML, or the like that enables the incorporation of the auxiliary content. In one embodiment, ACP server 108 may use an API provided by ECMS 106, or the like, to communicate at least some of the data and/or auxiliary content to ECMS 106. In one embodiment, ACP server 108 may provide the data and/or auxiliary content to ECMS 106 through an HTTP POST operation. However, the invention is not so limited, and an XML-RPC command may be used, or any of a variety of other mechanisms that allow an external application to provide and/or set text and or other attributes of a website.

One embodiment of ECMS server 106 is described in more detail below in conjunction with FIG. 2. Briefly, however, ECMS server 106 may include virtually any network device that is configured to host an enhanced content management system (ECMS) for use in managing content displayable at a website. While typical CMSs may enable a user to manage primary content at the website, the ECMS enhances this functionality by enabling management of auxiliary content for the website, as well. In one embodiment, the website may be hosted on ECMS server 106, although the invention is not so constrained. For example, the website may be hosted on a different server device than ECMS server 106.

ECMS server 106 may receive data and/or auxiliary content from another computing device, such as ACP 108, or the like. ECMS server 106 may then employ the ECMS to allow a user to incorporate the auxiliary content into the website. In one embodiment, ECMS server 106 provides an API for use in receiving the data and/or auxiliary content.

Devices that may operate as ACP server 108 and/or ECMS server 106 include personal computers, desktop computers, multiprocessor systems, microprocessor-based or programmable consumer electronics, network PCs, servers, and the like.

Illustrative Network Device

Figure 2:
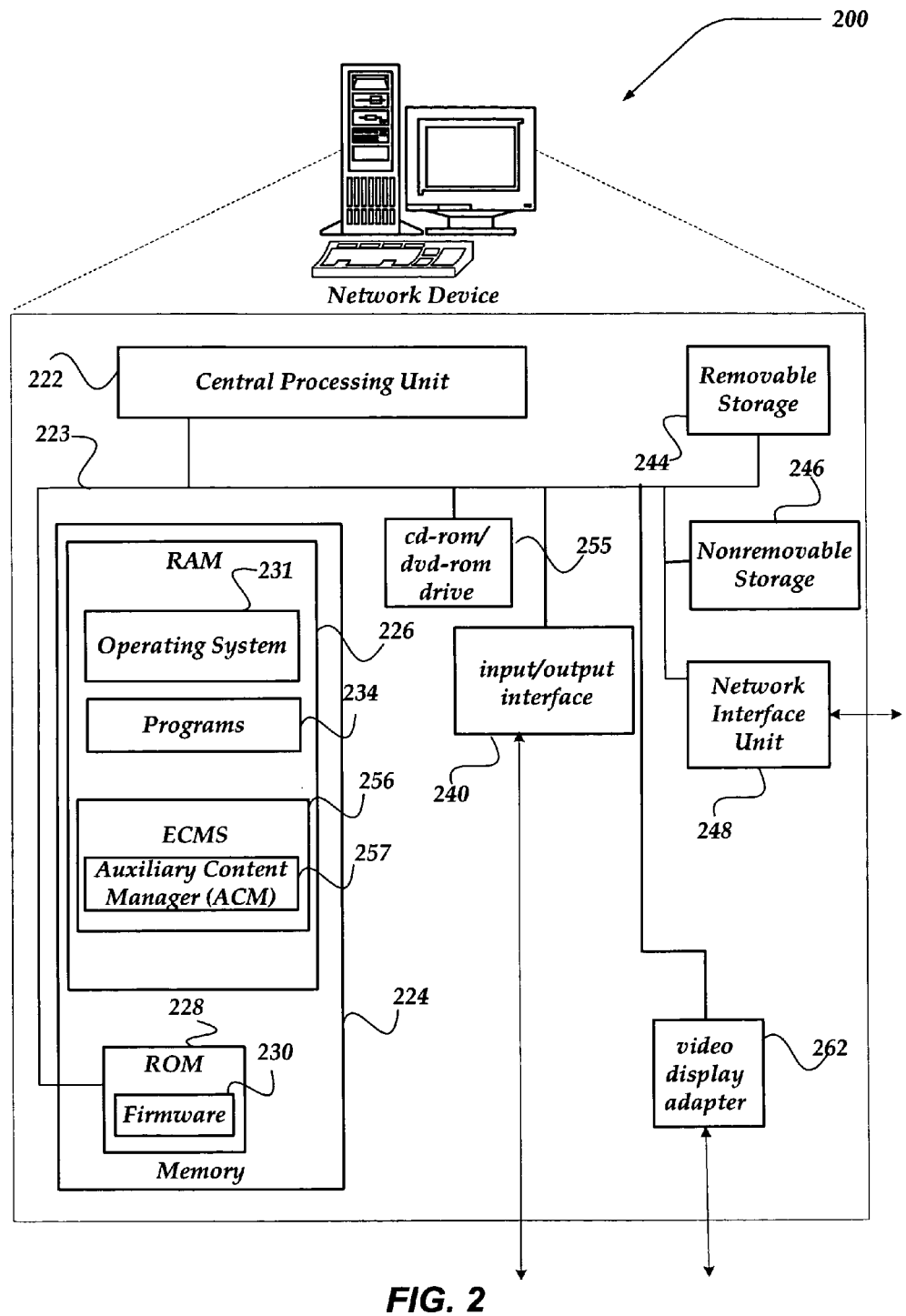
FIG. 2 shows one embodiment of a server device that may be included in a system implementing the invention.

FIG. 2 shows an exemplary network device 200 that may operate as ECMS server 106 of FIG. 1. It will be appreciated that not all components of network device 200 are illustrated, and that network device 200 may include more or less components than those shown in FIG. 2. The components shown, however, are sufficient to disclose an illustrative embodiment for practicing the invention.

As shown in FIG. 2, network device 200 includes at least one central processing unit 222 in communication with main memory 224 by way of bus 223 or the like. Main memory 224 generally includes RAM 226, ROM 228, and may include other storage means, such as one or more levels of cache (not shown). Main memory 224 illustrates a type of processor-readable media, namely computer storage media. Network device 200 includes cd-rom/dvd-rom drive 255, a form of CD-ROM, DVD, or other optical storage media. Computer storage media may also include volatile and nonvolatile, removable and non-removable media implemented in any method or technology for storage of information, such as processor-executable instructions, data structures, program modules, and the like. Other examples of computer storage media include EPROM, flash memory or other semiconductor memory technology, magnetic tape, magnetic disk storage or other magnetic storage devices, or any other medium that can be used to store the desired information and that can be accessed by a computing device.

Network device 200 includes an input/output interface 240 for communicating with input/output devices, such as a keyboard, mouse, printer, and the like. A user, such as a system administrator, or the like, of network device 200 may use input/output devices to interact by way of a user interface that may be separate from or integrated with operating system 231 and/or programs 234. Interaction with the user interface may include interaction by way of a visual display, using video display adapter 262.

Network device 200 may include secondary storage for storage of program modules, data, and the like not in main memory 224, including removable computer-readable storage 244 and/or non-removable computer-readable storage 246. Removable storage 244 may comprise one or more of optical disc media, floppy disks, and magnetic tape readable by way of an optical disc drive, floppy disk drive, and tape drive, respectively. Secondary storage may also include flash memory or other memory technology and generally includes any medium usable for storage of information and accessible by a computing device.

By way of network interface unit 248, network device 200 may communicate with a WAN, such as the Internet, a LAN, a wired telephone network, a wireless communications network, or some other communications network, such as network 104 of FIG. 1. Network interface unit 248 may comprise a transceiver, a network interface card, and the like. Network interface unit 248 is sometimes known as a transceiver, transceiving device, or network interface card (NIC).

Main memory 224 typically stores firmware 230 for bootloading and controlling low-level operation of network device 200. Main memory 224 also stores programs for loading and execution by central processing unit 222, such as operating system 231 and other programs 234, which may include, for example, server applications, client applications, networking applications, messaging applications such as applications for RSS communication, web server applications, security applications, SMS applications, IM applications, and the like. Main memory 224 may further include ECMS 256. ECMS 256 includes auxiliary content manager (ACM) 257. Although illustrated as a component within ECMS 256, the invention is not so limited. For example, ECMS 256 and ACM 257 may operate as distinct applications; ACM 257 may operate as a plug-in to ECMS 256; or the like; without departing from the scope or spirit of the invention.

ECMS 256 includes virtually any web application useable for organizing and facilitating websites and their content. As such, ECMS 256 may enable a user to design, publish, and otherwise mange websites. Typically ECMS 256 may operate on primary content and the overall look and/or feel of a website, while ACM 257 may provide functionality to design, incorporate, and otherwise manage auxiliary content of the website.

ACM 257 may operate to provide a user interface for managing the auxiliary content. In one embodiment, ACM 257 may provide a separate interface that may 'pop-up,' overlay, or otherwise reside at a separate location within a user's display. Examples of interfaces useable to manage auxiliary content are described in more detail below in conjunction with FIGS. 5-6.

ACM 257 may also provide an API, or other communications mechanism, that enables another computing device, such as ACP server 108 of FIG. 1, to provide data and/or auxiliary content, or the like. As described above, in one embodiment, the data provides a mechanism that may be useable to access the auxiliary content. For example, data and/or auxiliary content may be provided to ACM 257 using SMS, IM, email, FTP, or any of a variety of other communications mechanisms.

ACM 257 may receive data that includes a script, code, applet, application, or the like, that automatically enables access and incorporation of the auxiliary content. In one embodiment, ACM 257 may receive the data and store it at such as cd-rom/dvd-rom drive 255, non-removable computer-readable storage 246, or the like. In another embodiment, ACM 257 may retrieve the auxiliary content and store the auxiliary content. ACM 257 may also store the data and/or auxiliary content remotely. In addition, ACM 257 may employ a process substantially similar to process 400 described below in conjunction with FIG. 4.

Illustrative Interfaces

FIG. 3 illustrates one example of a webpage showing auxiliary content and primary content. In this example, the webpage represents one embodiment of a weblog or blog. However, the invention is not limited to blogs, and other webpage structures may be used, without departing from the scope or spirit of the invention. Moreover, it will be appreciated that not all components of webpage 300 are illustrated, and that webpage 300 may include more or less components than those shown in FIG. 3. It should be clear that the invention is not limited by this example; rather, it is employed herein to illustrate possible positioning of primary content and auxiliary content.

As shown in the figure, webpage 300 includes top bar 302, side bar 304, bottom bar 306, and main 308. It is important to note that more or less of the 'bars' may be used on a webpage. For example, although not shown, a side bar substantially similar to side bar 304 may also be located on a right side of main 308. Each of the components (bars and main) may be formed using a variety of mechanisms, including frames, scripts, or the like.

To illustrate a typical usage, top bar 302, side bar 304, and bottom bar 306 may include auxiliary content, while main 308 typically includes primary content. Thus, auxiliary content may be viewed as complementary to the theme of a website, based, at least in part, on its position with respect to primary content. However, this is not mandatory, and in one embodiment, auxiliary content may also reside within main 308, without departing from the scope or spirit of the invention.

In one embodiment, a template may be used for one or more of the bars (302, 304, or 306), and main 308. The template may include code, such as HTML code, a script, applet, or the like, that indicates a layout, view, or the like, for the content. When data and/or content are received, it may be incorporated within the template using the present invention.

Generalized Operation

Figure 4:
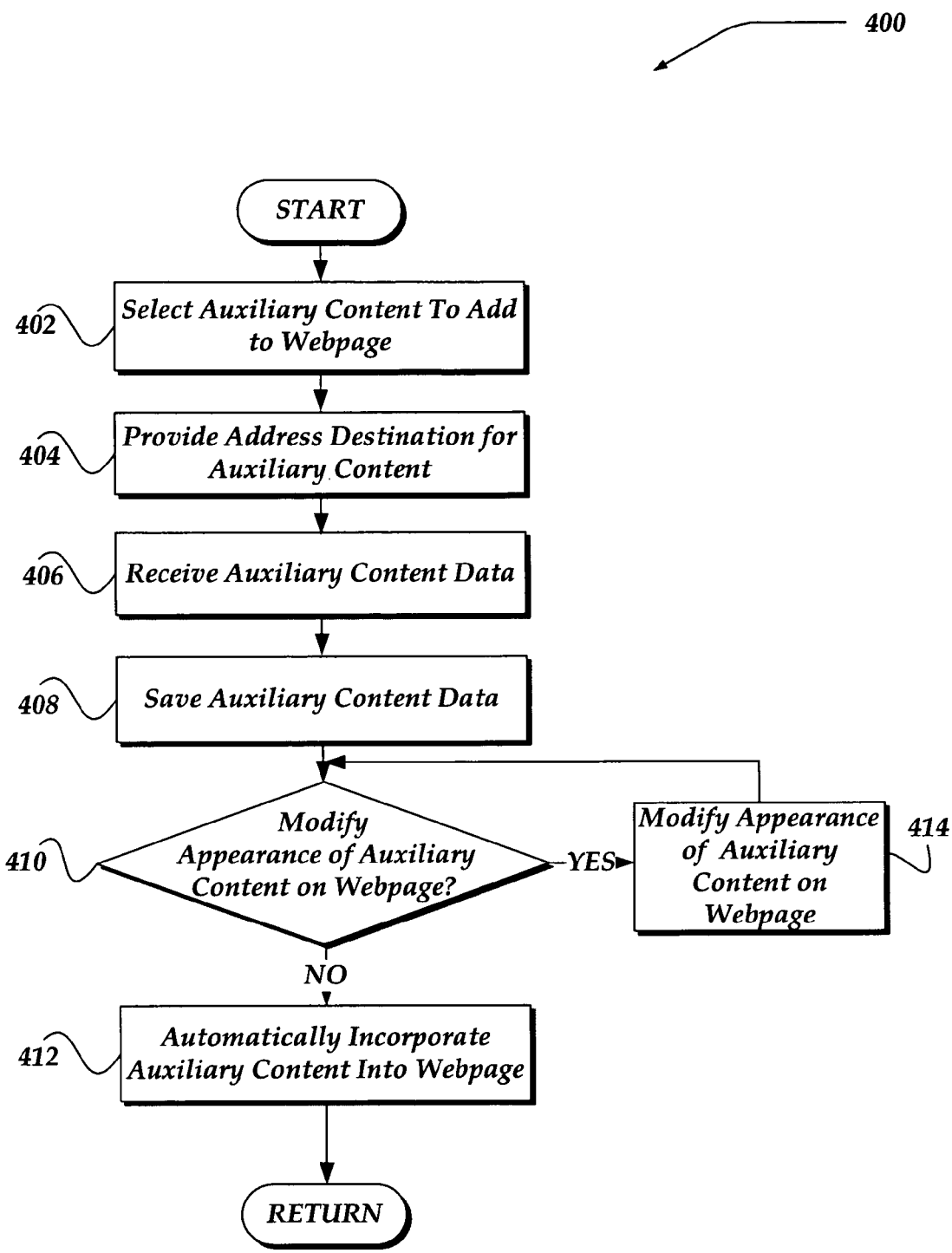
FIG. 4 illustrates a logical flow diagram generally showing one embodiment of a process for managing auxiliary content through an enhanced content management system.

The operation of certain aspects of the invention will now be described with respect to FIG. 4. FIG. 4 illustrates a logical flow diagram generally showing one embodiment of a process for managing auxiliary content through an enhanced content management system. Managing the auxiliary content includes managing of the auxiliary for use with a website, such as a blog, or the like, that may use at least one of a side bar, top bar, or bottom bar for displaying information, in addition to a main window or frame.

Process 400 of FIG. 4 begins, after a start block, at block 402, where auxiliary content is selected for addition into a webpage. In one embodiment, a user may employ a browser on their client device to access a remote site that may provide auxiliary content. The remote site, for example, may be ACP server 108 of FIG. 1. The remote site may provide an interface that allows the user to select auxiliary content for incorporation into the webpage.

Processing flows next to block 404, where the remote site is provided a network address for where the auxiliary content is to be provided. In one embodiment, the network address is associated with a server that may host the ECMS.

Process 400 continues then to block 406, where data associated with the auxiliary content is received. In one embodiment, the data includes code, a script, or the like, that enables the ECMS to access and otherwise incorporate the auxiliary content into the webpage. In one embodiment, the auxiliary content may also be received. The data and/or auxiliary content may be received using any of a variety of mechanisms, including an HTTP POST, an SMS message, an FTP transfer or the like. Processing continues next to block 408, where the received data and/or auxiliary content may be saved. In one embodiment, saving the data and/or auxiliary content allows for ready modification of the auxiliary content and/or data.

Figure 5:
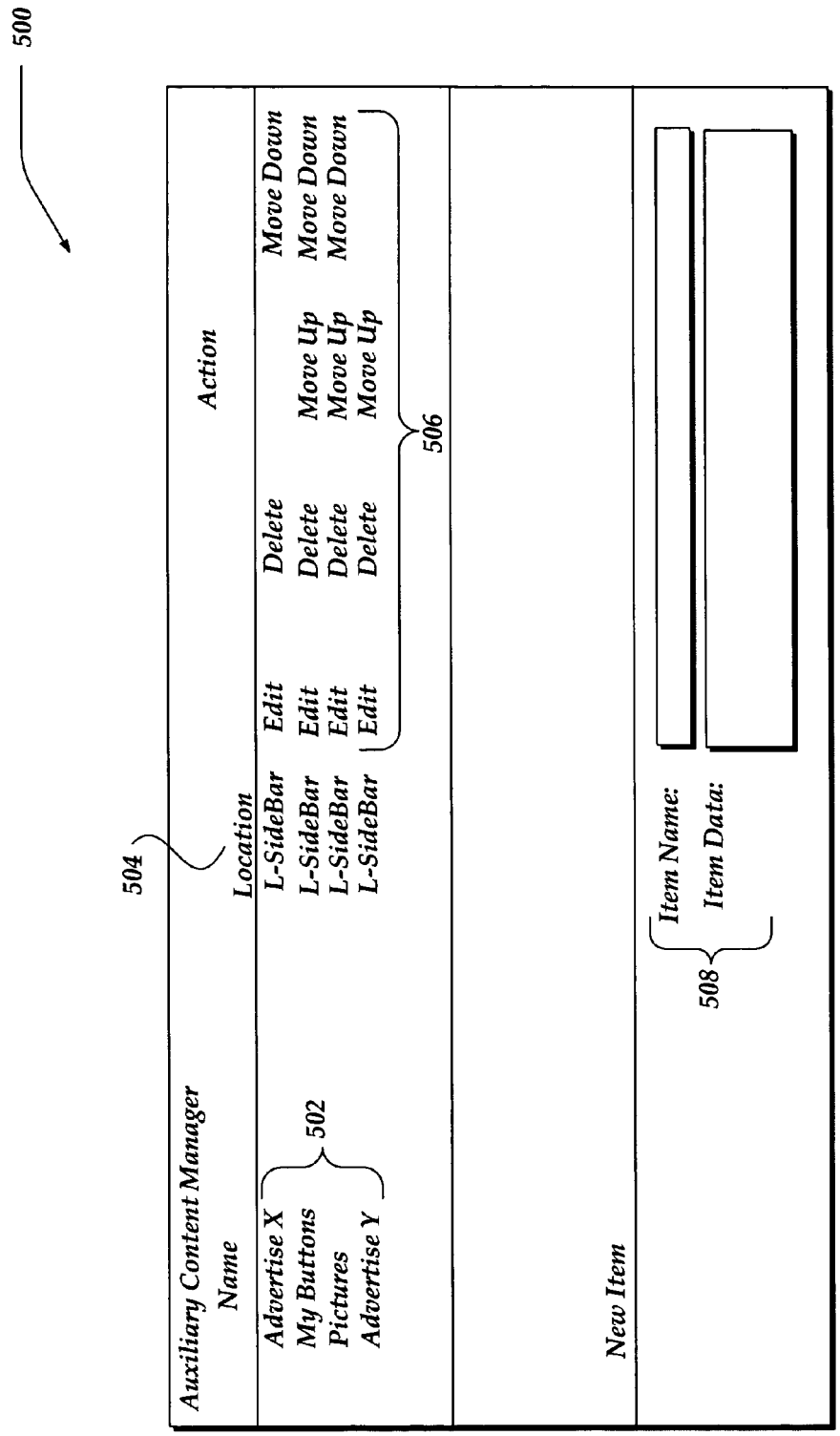
FIG. 5 shows one embodiment of an interface for use in managing auxiliary content to a blog.
Figure 6:
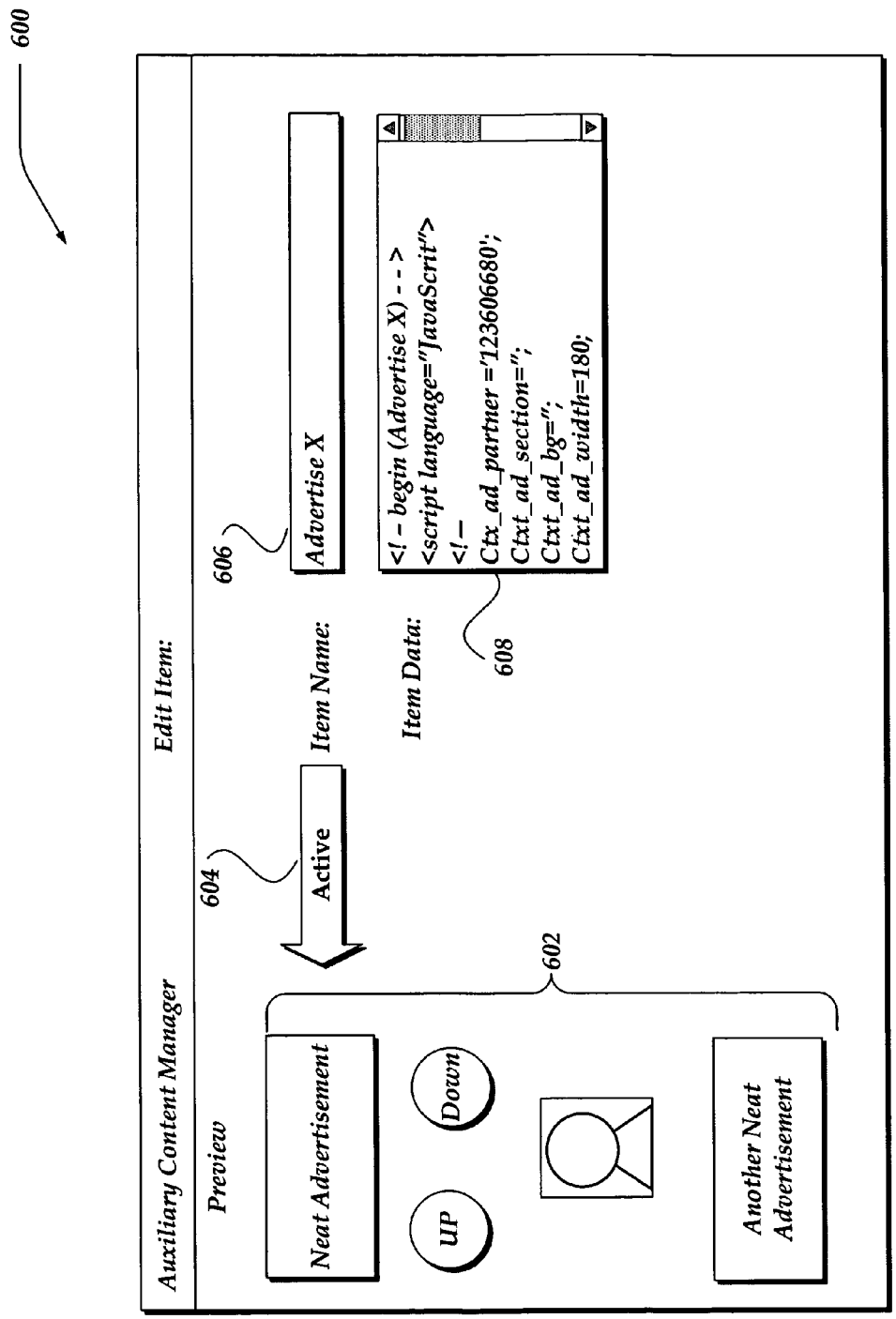
FIG. 6 shows one embodiment of another interface for use in further managing auxiliary content to the blog, in accordance with the present invention.

Processing flows next to decision block 410, where a determination is made whether an appearance of the auxiliary content on the webpage is to be modified. Modification of the appearance may include, but is not limited to, positioning the auxiliary content within a bar, hiding the auxiliary content, editing the auxiliary content, or the like. In one embodiment, modification of the appearance may further include positioning the auxiliary content within a main screen, frame, or the like, with respect to primary content. If modification of the appearance is to be performed, processing flows to block 414, where the appearance of the auxiliary content on a webpage may be modified. As possible embodiments, FIGS. 5-6 illustrate example interfaces for use in modifying the appearance of the auxiliary content. Processing then loops back to decision block 410, to allow the user to make additional modifications as appropriate.

If, at decision block 410, no modifications are to be performed, processing flows to block 412, where the auxiliary content may be automatically incorporated into the webpage. In one embodiment, the data, including code, script, applet, or the like, is used, at least in part, to incorporate the auxiliary content into a template for use in modifying the frame, or bar in which the auxiliary content is automatically incorporated. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions, and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

As mentioned above, FIGS. 5-6 show embodiments of an interface for use in managing auxiliary content to a webpage. FIGS. 5-6 may, for example, illustrate possible interfaces useable with ACM 257 of FIG. 2. It will be appreciated that not all components of FIGS. 5-6 are illustrated and that they may include more or less components than those shown. The components shown, however, are sufficient to disclose illustrative interface embodiments for practicing the invention.

As shown in FIG. 5, interface 500 includes auxiliary content identifiers 502, location selector 504, action selectors 506, and new item information 508.

Auxiliary content identifiers 502 include labels, names, or similar monikers that may be employed to identify various auxiliary content items. In one embodiment, auxiliary content identifiers 502 may indicate a position of one auxiliary content item with respect to another auxiliary content item within a bar, frame, or the like.

Location selector 504 provides a user an ability to locate auxiliary content within different bars. Thus, location selector 504 may employ a menu, fill in the blank, or the like, that allows the user to change a bar within which an auxiliary content item may appear. For example, location selector 504 may allow the user to change an auxiliary content item from a left side bar, a right side bar, a top side, or a bottom side. In one embodiment, location selector 504 may also allow the user to place an auxiliary content item within a main window, or frame.

New item information 508 may allow a user to add an auxiliary content item to a bar by entering its identifier, and/or data associated with the auxiliary content item.

Action selectors 506 enable a user to modify a position or appearance of an auxiliary content item. For example, the user may be enabled to move one auxiliary content item up or down in relationship to another auxiliary content item within auxiliary content items. Moreover, action selectors 506 may also allow the user to delete an auxiliary content item from display, hide an auxiliary content item, or even edit other aspects of its appearance.

One embodiment of an interface for use in editing an auxiliary content item is illustrated in FIG. 6. As shown interface 600 includes preview 602, active indicator 604, item name 606, and item data 608. Preview 602 may illustrate how one or more auxiliary content items may appear on a webpage. Active indicator 604 may be used to indicate which auxiliary content item is being edited, while item name 606 indicates the identifier associated with the auxiliary content item, and item data 608 includes associated data for the auxiliary content item. As shown, the user may edit item data 608 to further modify an appearance of the auxiliary content item, including, but not limited to, its size, borders associated with the auxiliary content item, a color, font sizes, or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device configured to manage content on a web page over a network; comprising:
 a memory component for storing data and instructions associated with an auxiliary content manager; and
 a processor enables execution of the stored data and instructions on the memory component to perform actions, including:

displaying a graphical user interface to a user at a client device, wherein the graphical user interface enables the user to manage auxiliary content within at least one of a side bar, top bar, or bottom bar of a web blog;

receiving a plurality of auxiliary content for management within one or a side bar, top bar, or bottom bar;

displaying at the client device, an interface menu having displayed therein a list of each of the received plurality of auxiliary content, and for each of the plurality of auxiliary content in the list further displaying a location selector that enables the user to select and display whether the each of the plurality of auxiliary content in the list is to be displayed within the top bar, side bar, or bottom bar of the web blog, and further simultaneously displaying action selectors for the each of the plurality of auxiliary content that enable the user to select one of the action selectors displayed to move a related one of the plurality of auxiliary content listed up or down relative to another one of the plurality of auxiliary content listed; wherein the interface menu displays the top bar, side bar or bottom bar as a location for the each of the plurality of auxiliary content listed; and receiving at least one input of the action selection from the client device that results in movement of the one of the plurality of auxiliary content selected up or down relative to the another one of the plurality of auxiliary content listed.

2. The network device of claim 1, wherein the displayed movement action selector includes a move-up and a move-down action selector for each of the plurality of auxiliary content.

3. The network device of claim 1, wherein the processor performs actions, further including:

receiving an input from the client device that changes a location of one of the listed auxiliary content from one of a top bar, side bar, or bottom bar to a different one of a top bar, side bar, or bottom bar, by changing the displayed location selector indicated for the auxiliary content.

4. The network device of claim 1, wherein the processor performs actions, further including:

displaying an edit action selector at the client device within the interface menu;

receiving a user input indicating that one of the plurality of auxiliary content is to be edited;

enabling the user to edit the auxiliary content; and providing a preview display to the client device that enables the user to preview a display of at least the edited auxiliary content.

5. The network device of claim 1, wherein the auxiliary content includes at least one of a sponsored advertisement, a brand, a graphic, a picture, or a movie.

6. A client device configured to manage content on a web page over a network; comprising:

a memory component for storing data and instructions for accessing an auxiliary content manager; and a processor enables execution of the stored data and instructions on the memory component to perform actions, including:

displaying a graphical user interface to a user at the client device, wherein the graphical user interface enables the user to manage auxiliary content within at least one of a side bar, top bar, or bottom bar of a web blog;

providing information useable to access by the auxiliary content manager a plurality of auxiliary content for management within one or a side bar, top bar, or bottom bar;

displaying at the client device, an interface menu having displayed therein a list of each of the received plurality of auxiliary content, and for each of the plurality of auxiliary content in the list further displaying a location selector displays that enables the user to select and display whether the each of the plurality of auxiliary content in the list is to be displayed within a top bar, side bar, or bottom bar of the web blog, and further simultaneously displaying action selectors for the each of the plurality of auxiliary content that enables the user to select one of the action selectors displayed to move a related one of the plurality of auxiliary content listed up or down relative to another one of the plurality of auxiliary content listed; wherein the interface menu displays the top bar, side bar or bottom bar as a location for the each of the plurality of auxiliary content listed; and providing at least one input of the action selection from the client device that results in movement of the one of the plurality of auxiliary content selected up or down relative to the another one of the plurality of auxiliary content listed.

7. The client device of claim 6, wherein the auxiliary content further comprises content associated with at least one of news, finances, education, sports, weather, technical, business, or personal.

8. The client device of claim 6, wherein the processor performs actions, further including:

providing an input from the client device that changes a location of one of the listed auxiliary content from one of a top bar, side bar, or bottom bar to a different one of a top bar, side bar, or bottom bar, by changing the displayed location selector indicated for the auxiliary content.

9. The client device of claim 6, wherein the processor performs actions, further including:

displaying an edit action selector at the client device within the interface menu;

receiving a user input indicating that one of the plurality of auxiliary content is to be edited;

enabling the user to edit the auxiliary content; and providing a preview display to the client device that enables the user to preview a display of at least the edited auxiliary content.

* * * * *

UNITED STATES PATENT AND TRADEMARK OFFICE
CERTIFICATE OF CORRECTION

PATENT NO. : 7,636,766 B2 Page 1 of 1
APPLICATION NO. : 11/274245
DATED : December 22, 2009
INVENTOR(S) : Marc S. Abramowitz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Ninth Day of November, 2010

David J. Kappos
*Director of the United States Patent and Trademark Office*